(12) United States Patent
King et al.

(10) Patent No.: US 6,405,747 B1
(45) Date of Patent: Jun. 18, 2002

(54) FUEL TANK VENT VALVE WITH LIQUID CARRYOVER FILTER

(75) Inventors: Timothy J. King; Gregory P. Brown, both of Connersville, IN (US)

(73) Assignee: Stant Manufacturing, Inc.

( * ) Notice: Subject to any disclaimer, the term of this patent is extended or adjusted under 35 U.S.C. 154(b) by 0 days.

(21) Appl. No.: 09/697,842

(22) Filed: Oct. 27, 2000

Related U.S. Application Data

(60) Provisional application No. 60/162,723, filed on Oct. 29, 1999.

(51) Int. Cl.$^7$ ............................................. F16K 24/04
(52) U.S. Cl. ........................... 137/202; 137/43; 137/587
(58) Field of Search ........................... 137/43, 202, 587

(56) References Cited

U.S. PATENT DOCUMENTS

| | | | |
|---|---|---|---|
| 3,152,604 A | * 10/1964 | Frye et al. ................... 137/202 |
| 4,685,584 A | * 8/1987 | Harris ..................... 137/202 X |
| 4,760,858 A | 8/1988 | Szlaga ........................... 137/43 |
| 4,816,045 A | 3/1989 | Szlaga et al. .................. 55/168 |
| 4,826,511 A | 5/1989 | Harris ........................... 55/168 |
| 4,953,583 A | 9/1990 | Szlaga ........................ 137/118 |
| 5,028,244 A | 7/1991 | Szlaga ........................... 55/170 |
| 5,156,178 A | 10/1992 | Harris ........................... 137/43 |
| 5,215,132 A | 6/1993 | Kobayashi .................. 141/302 |
| 5,234,013 A | 8/1993 | Roetker et al. ................ 137/43 |
| 5,261,439 A | 11/1993 | Harris ........................... 137/43 |
| 5,318,069 A | 6/1994 | Harris ......................... 137/588 |
| 5,566,705 A | 10/1996 | Harris ........................... 137/43 |
| 5,577,526 A | 11/1996 | Kasugai et al. |
| 5,687,778 A | 11/1997 | Harris ........................... 141/59 |
| 5,694,968 A | 12/1997 | Devall et al. ................ 137/202 |
| 5,762,093 A | * 6/1998 | Whitley .................. 137/202 X |
| 5,782,258 A | 7/1998 | Herbon et al. |
| 5,927,315 A | * 7/1999 | Kim ....................... 137/202 X |
| 5,944,044 A | 8/1999 | King et al. .................. 137/202 |
| 6,035,884 A | 3/2000 | King et al. .................. 137/202 |
| 6,158,456 A | * 12/2000 | Enge ........................... 137/202 |

FOREIGN PATENT DOCUMENTS

DE             19628583 A     1/1998

OTHER PUBLICATIONS

European Search Report for EP00309553.6.

* cited by examiner

*Primary Examiner*—Gerald A. Michalsky
(74) *Attorney, Agent, or Firm*—Barnes & Thornburg

(57) ABSTRACT

An apparatus for controlling discharge of fuel vapor from within a vehicle fuel tank, which apparatus includes at least a primary and auxiliary liquid separating chamber positioned above a float chamber below a valve outlet. The apparatus includes at least one baffle arranged to intercept and direct filtered fuel droplets from the vapor flow and return the liquid fuel to the fuel tank. The primary and auxiliary liquid separation chambers and associated baffle are positioned to facilitate flow of fuel vapor from the tank yet return liquid fuel to the tank.

10 Claims, 4 Drawing Sheets

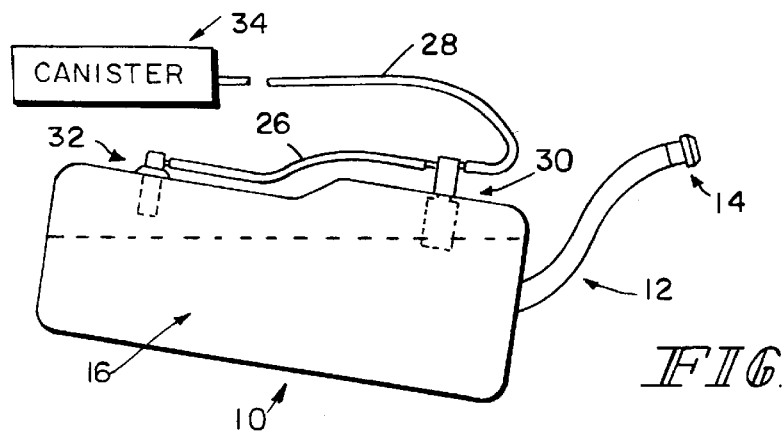
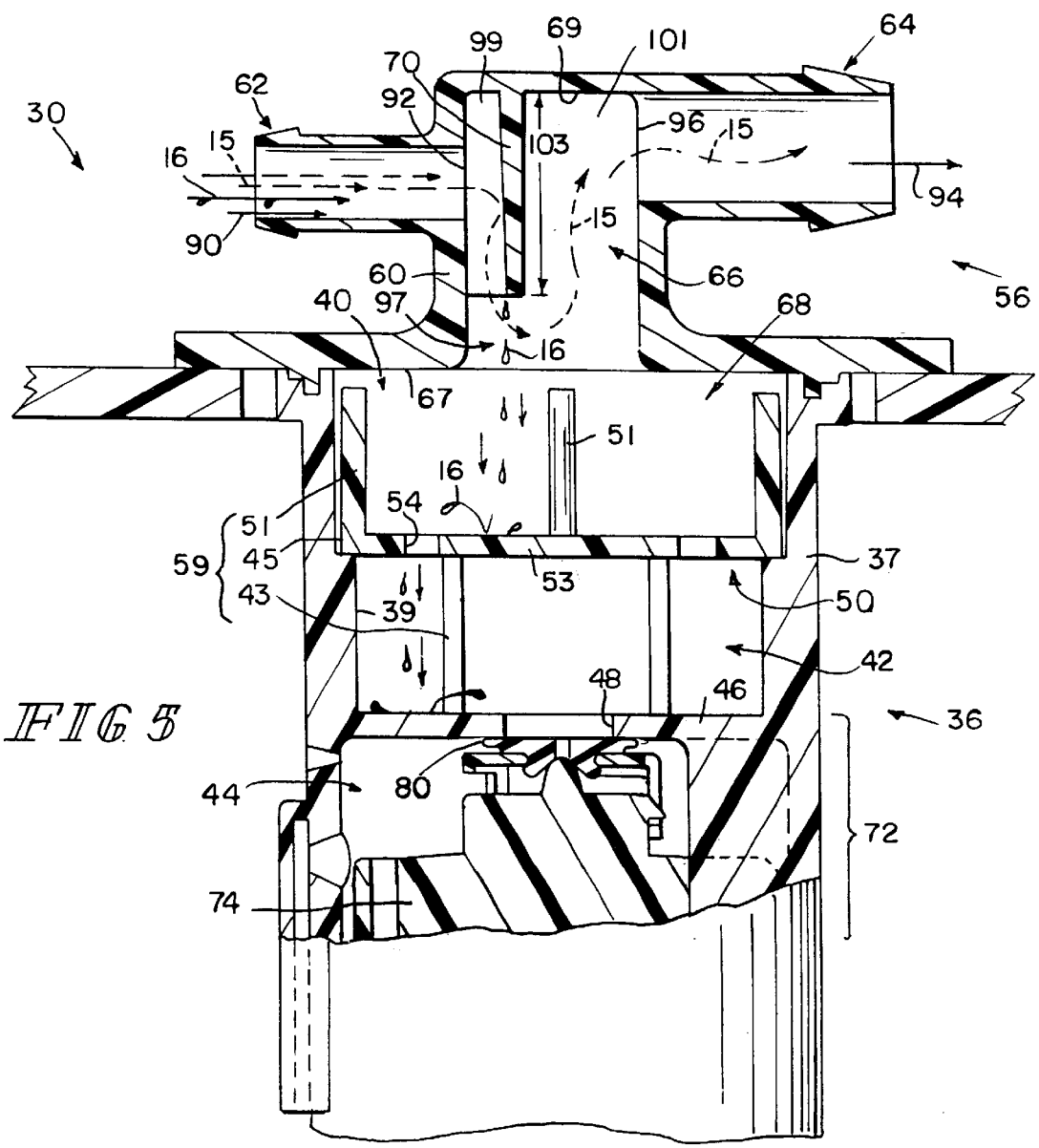

FUEL TANK VENT VALVE WITH LIQUID CARRYOVER FILTER

This application claims priority under 35 U.S.C. 119(e) to U.S. Provisional Application Ser. No. 60/162,723, filed Oct. 29, 1999, which is expressly incorporated by reference herein.

BACKGROUND AND SUMMARY OF THE INVENTION

The present invention relates to systems for controlling venting of fuel vapor from a vehicle fuel tank, and particularly to a vent valve in a fuel valve tank venting system. More particularly, the present invention relates to a tank valve which prevents liquid fuel within a fuel valve tank venting system from entering and contaminating a vapor recovery canister within the system.

Significant quantities of fuel vapor can escape from a fuel tank and out to the atmosphere during the refueling of motor vehicles. Early attempts to control the vapor escape focused upon control devices fitted to a fuel dispensing pump nozzle connected to a service station fuel pump. Later, control devices mounted directly on board the vehicle were developed. See, for example, U.S. Pat. No. 4,816,045 to Szlaga et al. relating to a vapor recovery system mounted on the fuel tank filler neck. Tank venting systems which mount to a fuel tank have also been developed as shown, for example, in U.S. Pat. No. 5,156,178 to Harris. Typical vehicle fuel tanks often contain a valve, or a set of valves, mounted to the top of the fuel tank which vent fuel vapor to a vapor-recovery canister during refueling, thereby preventing the vapor from escaping to the atmosphere. When the liquid fuel level within the tank nears the top of the tank, the valve or set of valves, floats closed causing a pressure "back-up" to the fuel dispensing nozzle. A sensor within the nozzle senses this "back up" and causes the nozzle to shut off before the tank is over-filled.

After refueling, vehicle operation causes the fuel level within the tank to subside. The tank vent valves, therefore, reopen and any fuel vapor that is generated in the fuel tank during operation of the vehicle (e.g., by evaporation or by sloshing of the liquid fuel against the walls of the tank) is carried by a fuel vapor conduit to a vapor recovery canister. Excessive sloshing or high pressure within the fuel tank can cause "liquid carryover" wherein liquid fuel escapes past the valves and travels to the vapor recovery canister along with fuel vapor. Liquid fuel within the vapor recovery canister contaminates the canister rendering it ineffective. Mechanisms to prevent liquid from escaping to the vapor recovery canister through the tank valves would help to prevent contamination of the canister.

According to the present invention, a tank vent valve includes a valve container coupled to a valve lid adapted to be mounted to a vehicle fuel tank. The interior of the vent valve is partitioned into three chambers—a float chamber, a primary liquid separation chamber, and an auxiliary liquid separation chamber. A float valve assembly is positioned within the float chamber and is operable between an opened and closed position. In its closed position, the float valve prevents fuel vapor from escaping from the fuel tank through the vent valve. A canister nipple is formed in the valve lid and defines an outlet port from the auxiliary liquid separation chamber to the vapor-recovery canister. Opposite the canister nipple, and also formed as part of the valve lid, is an inlet nipple defining an inlet port from a second vent valve mounted to the fuel tank at a different location to the auxiliary liquid separation chamber.

A diversion baffle is positioned in the lid chamber and between the inlet port and the outlet port to create an obstacle preventing direct flow from the outlet port through the lid chamber to the inlet port.

A baffle is provided to separate the primary liquid separation chamber from the auxiliary liquid separation chamber. The baffle serves to redirect and block liquid flow escaping through a venting outlet. In this way, liquid fuel is prevented from flowing to and through the outlet port.

In preferred embodiments, the valve lid is molded to include a cover dome which defines the lid chamber. Further, molded inside the cover dome is the diversion baffle. In one embodiment, the diversion baffle includes a front wall and two side walls and a downwardly-facing opening to the lid chamber.

In preferred embodiments, the baffle provides a protector floor within the valve container which separates the primary liquid separation chamber from the auxiliary liquid separation chamber. The protector floor is formed to include multiple apertures. Further, the baffle is formed to include several legs, also arranged around the perimeter, which serve to maintain the baffle in spaced apart relationship with the valve lid.

Additional features and advantages of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 4 is a side view of a fuel tank canted in a first direction and showing a first vent valve immersed in liquid fuel and a second vent valve above the level of liquid fuel in the tank;

FIG. 5 is an enlarged side view, with portions cut away, showing a tank vent valve according to the present invention showing liquid fuel entering through an inlet port and contacting a diversion baffle, thereby directing the liquid fuel down into the tank vent valve and away from the outlet port;

DETAILED DESCRIPTION OF THE DRAWINGS

Figure 1:
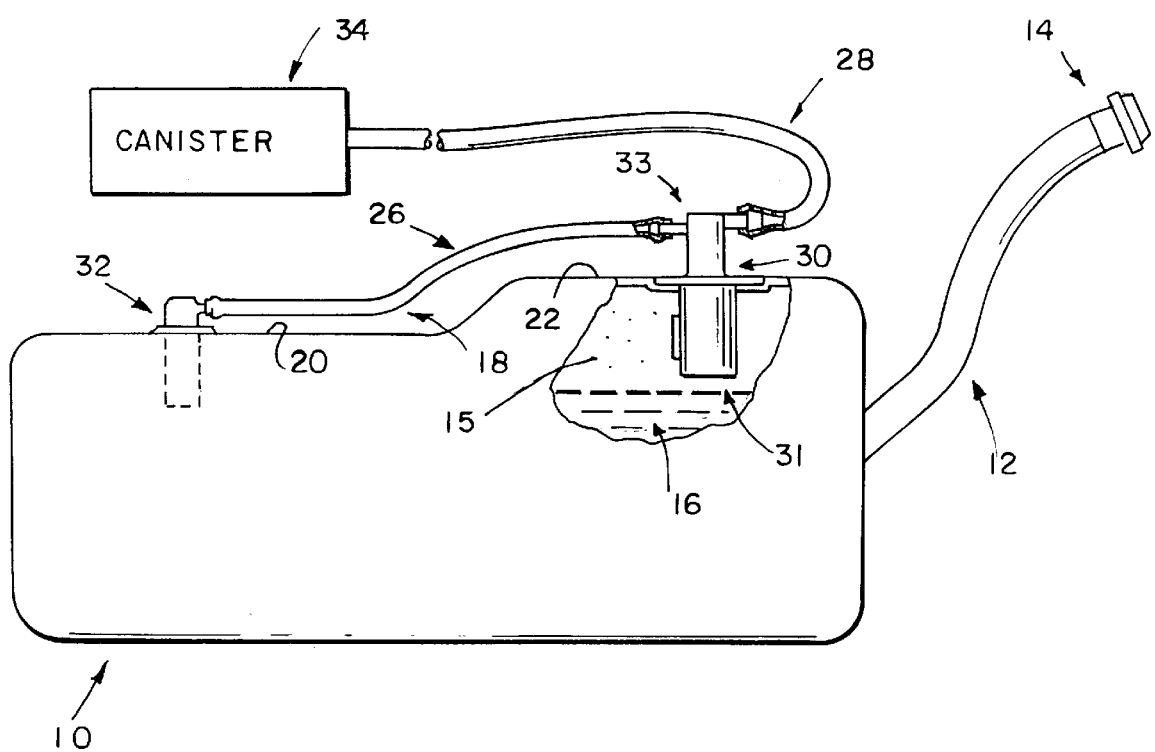
FIG. 1 is a side view, with portions cut away showing a fuel tank having a filler neck and including two vent valves, in vapor communication with a vapor-recovery canister, which work in concert to vent the fuel tank.

A tank venting system is shown in FIG. 1. A fuel-dispensing nozzle (not shown) is inserted into a mouth 14 of a filler neck 12 which is attached to a fuel tank 10. The fuel-dispensing nozzle (not shown) dispenses liquid fuel 16 into filler neck 12, thereby filling fuel tank 10. As the level of fuel 16 within fuel tank 10 rises, fuel vapor 15 created within tank 10 above liquid fuel 16 escapes through a second vent valve 32 and a first vent valve or apparatus 30 into a vapor-recovery canister 34. Vent valve 30 includes an inlet 31 in communication with fuel tank 10 and an outlet 33 in communication with second vent valve 32 and canister 34. When the level of liquid fuel 16 within tank 10 reaches second vent valve 32, second vent valve 32 floats closed and fuel vapor can then escape only through first vent valve 30 which is mounted on an upper tier 22 of tank 10. When the level of liquid fuel 16 in tank 10 reaches first vent valve 30, it too floats closed, preventing fuel vapor in a vapor dome 24 from escaping fuel tank 10. This creates a pressure back-up in filler neck 12 causing the fuel-dispensing nozzle to shut off.

As the level of liquid fuel 16 within 10 tank subsides through use of the vehicle, first vent valve 30 will open followed by second vent valve 32. Fuel vapor which is subsequently created during vehicle use (e.g., from sloshing fuel 16, pressure buildup within tank 10, etc.) escapes through opened first and second vent valves 30, 32 and to vapor-recovery canister 34. Excessive sloshing of liquid fuel 16 directly against first and second vent valves 30, 32 should cause first and second vent valves 30, 32 to temporarily float closed. However, some sloshing liquid fuel 16 may escape through a vent valve before it can float closed.

Figures 2, 3:
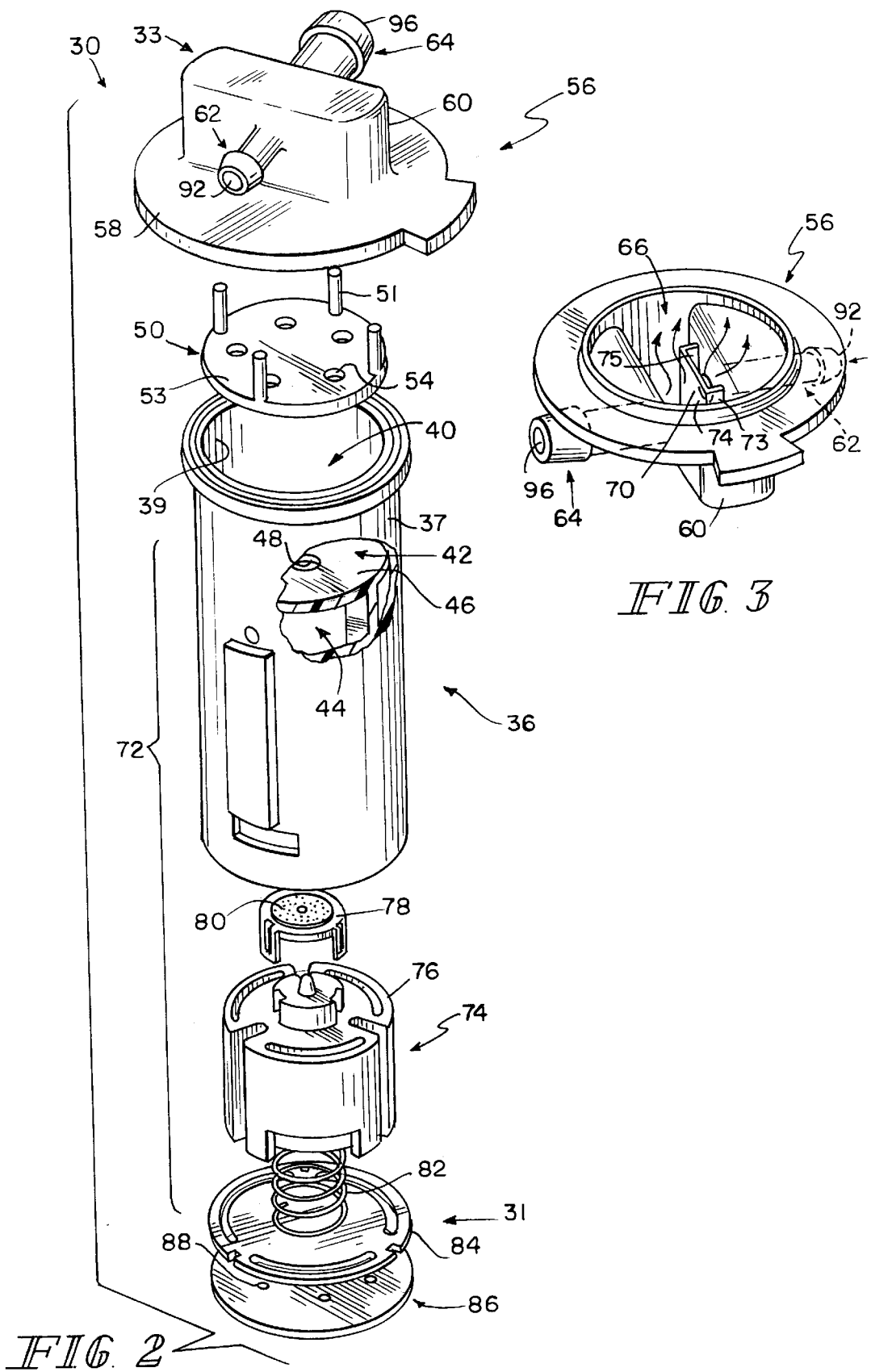
FIG. 2 is an exploded perspective view of a tank vent valve in accordance with the present invention showing a baffle positioned between a primary liquid separation chamber and an auxiliary liquid separation chamber to create an obstacle to and divert the flow of liquid fuel flowing from a float chamber and through a venting outlet.
FIG. 3 is an inverted bottom view of a valve lid of FIG. 2 showing a diversion baffle positioned between an outlet port and an inlet port to downwardly divert fuel entering from the inlet port.

As can be seen in FIG. 2, a tank valve 30 according to the present invention includes a valve housing or valve container 36 which is adapted to be installed in a fuel tank, an upper housing or valve lid 56, a baffle plate or slosh protector 50, a valve assembly or float valve 72, a retainer 84 and a base 86 having pin holes 88 formed therein. The valve assembly 72 includes intermediate wall 46 having a venting outlet 48, float valve 74, float cage 78, and spring 82. The valve assembly 72 is adapted for movement between an open position allowing flow of fuel vapor through the apparatus 30 and outlet and a closed position preventing flow of at least fuel vapor through the outlet. The valve assembly 72 controllably provides communication between the inlet 31 and outlet 33.

Figures 6, 7:
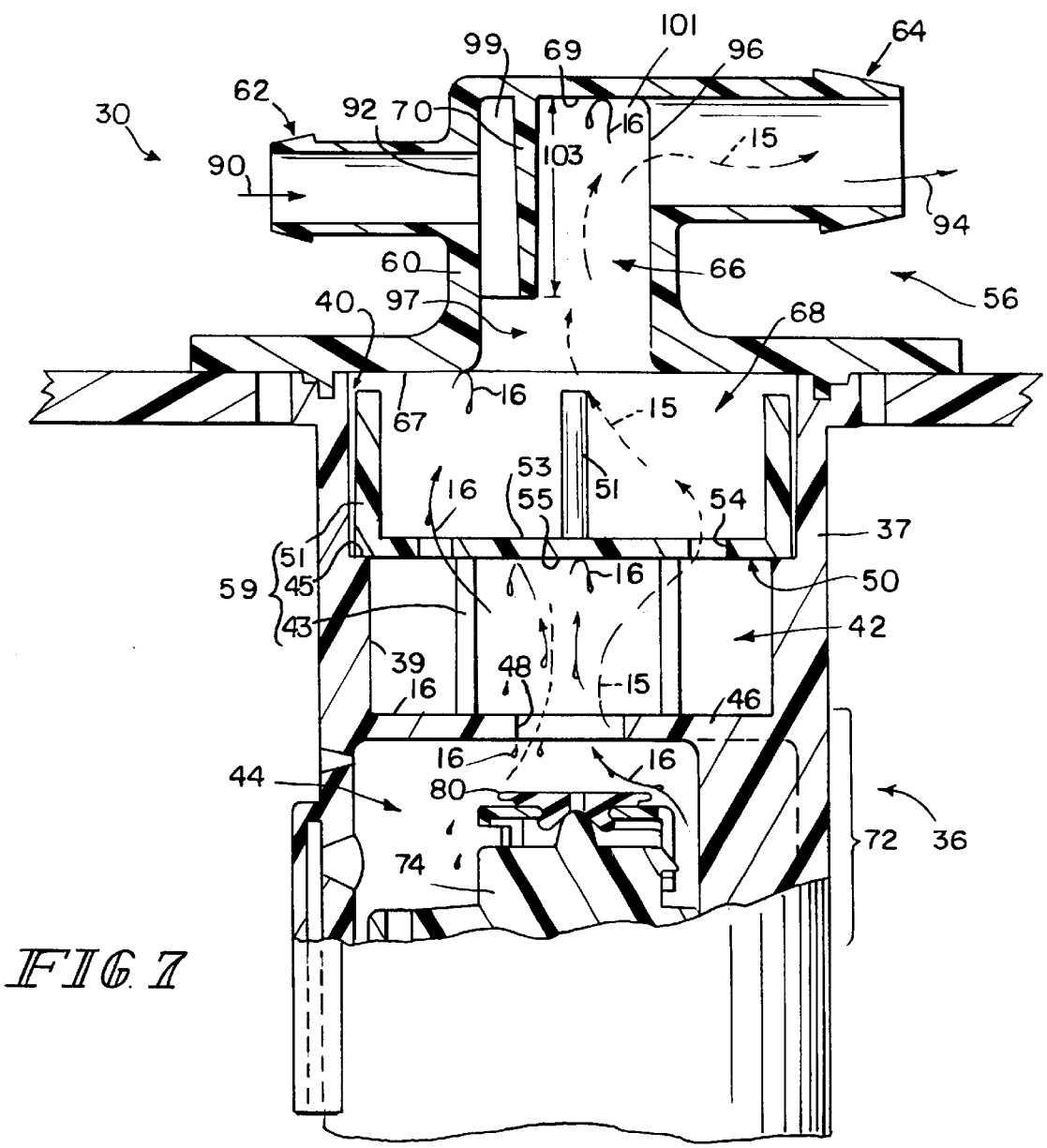
FIG. 6 is a side view of a fuel tank canted in a direction opposite as that shown in FIG. 5, showing the second vent valve immersed in liquid fuel and the first vent valve above the level of liquid fuel in the tank.
FIG. 7 is an enlarged side view, with portions cut away, showing a tank vent valve according to the present invention showing liquid fuel splashing up through a venting outlet in the first vent valve and contacting a protector floor of the baffle, and additional liquid fuel splashing through apertures in the protector floor and contacting a top wall and ceiling of an auxiliary liquid separation chamber and falling back down through the tank vent valve.

As shown in FIGS. 2, 5 and 7, valve container 36 defines a main chamber 40 therein. Intermediate wall 46 divides the main chamber 40 defining a float chamber 44, bounded one end by intermediate wall 46 coupled to the interior of valve container 36 within main chamber 40 and at the other end by retainer 84 coupled to valve container 36 within the main chamber 40. Within float chamber 44, a float valve 74 is slidably positioned to move between a closed position blocking venting outlet 48 formed within intermediate wall 46 and an opened position permitting flow through venting outlet 48. Float valve 72 may be any one of several conventional float valves known to those skilled in the art, including a two-stage reopening valve as shown in FIGS. 2, 5, and 7 and further described in U.S. Pat. No. 5,694,968 to Devall et al.; U.S. Pat. No. 5,318,069 to Harris; and U.S. Pat. No. 5,944,044 to King et al., the disclosures of which are incorporated herein by reference. The two-stage reopening float valve assembly shown in FIG. 2 includes float valve 74 having wing segments 76, a float cage 78, a seal gasket 80, and a float spring 82.

As best shown in FIGS. 5 and 7 valve container 36 includes a cylindrical sleeve 37 having an inner wall 39. Molded to inner wall 39 and above intermediate wall 46 within main chamber 40 are support ribs 43 defining ledges 45. Support ribs 43 act to hold slosh protector 50 within main chamber 40 in spaced apart relationship with intermediate wall 46. In this way a primary liquid separation chamber 42 is defined between intermediate wall 46 and the baffle or slosh protector 50. Liquid fuel 16 escaping past float valve 74 and up through venting outlet 48 is interrupted and redirected by slosh protector 50, as best shown in FIG. 7. Slosh protector 50 is foraminous and further includes multiple apertures 54 in a protector floor 53 which allow fuel vapor 15 to pass therethrough. Apertures 54 are positioned to prevent alignment with the generally centrally located venting outlet 48 in intermediate wall 46 such as near the perimeter of protector floor 53. Placement of slosh protector 50 within main chamber 40 of valve container 36 further defined above it an auxiliary liquid separation chamber 68 of main chamber 40. Slosh protector 50 further includes legs 51 at the perimeter of protector floor 53 which surround protector chamber 52 and maintain protector floor 53 in a desired orientation in main chamber 40 such as in spaced-apart relationship with a cover portion 58 of valve lid 56. Ledges 45 and legs 51 define positioning structures 59 which maintain baffle 50 in a desired orientation in main chamber 40.

Valve lid 56 is coupled to valve container 36 and is adaptable to be mounted to fuel tank 10. As best shown in FIGS. 3, 5, and 7, lid 56 is formed to include a cover dome 60 which defines a lid chamber 66 therein. As best shown in FIG. 7, lid chamber 66 cooperates with auxiliary liquid separation chamber 68 to provide further obstruction and diversion for liquid fuel 16 which happens to find its way through apertures 54 in protector floor 53 and into auxiliary slosh chamber 68. For example, liquid fuel will contact and agglomerate on top wall 67 and ceiling 69 and drain, generally, into main chamber 40.

On opposite sides of cover dome 60 are molded an inlet nipple 62 and a canister nipple 64, generally, in relative alignment with each other. Inlet nipple 62 defines a second valve passageway 90 which opens through an inlet port 92 into lid chamber 66 and canister nipple 64 defines a canister passageway 94 which opens through an outlet port 96 into lid chamber 66. Inlet port 92, lid chamber 66 and outlet port 96 define generally a flow path 97 from second valve 32 to canister 34.

Molded to ceiling 69 of lid chamber 66, and in spaced-apart relationship with inlet port 92, is a diversion baffle 70. Diversion baffle 70 extends at least partially across flow path 97 to divert liquid fuel vapor entrained in the fuel vapor and liquid fuel. Diversion baffle 70 serves to obstruct flow of fuel vapor 15 and liquid fuel 16 through outlet 33 such as when it enters though second valve passageway 90 from second vent valve 32 coupled to fuel tank 10 at a location removed from vent valve 30 (as best shown in FIG. 1). The illustrated embodiment of the diversion baffle 70 has a front wall 71 and two side walls 73 which (as shown in FIG. 2) surround a downwardly facing opening 75. Diversion baffle 70 is oriented in lid chamber 66 to drain into auxiliary separation chamber 68. Diversion baffle 70 is positioned in lid chamber 66 to define an input chamber 99 between inlet port 92 and diversion baffle 70 and an output chamber 101 between outlet port 96 and diversion baffle 70. Diversion baffle 70 extends a dimension 103 for producing an obstacle preventing direct flow from the inlet port 92, through lid chamber 66 and out outlet port 96. In the illustrated embodiment, input chamber 99 has a volume which is less than a correspondingly measured volume of outlet port 96 to help promote agglomeration of fuel on diversion baffle 70. The volume differential reduces the velocity of liquid fuel and vapor to promote interception and separation of liquid.

As discussed above, modern tank venting systems may include multiple tank vent valves as shown for example in U.S. Pat. No. 5,687,778 to Harris, the disclosure of which is incorporated by reference herein. These valves close during refueling, preventing escape of fuel vapor 15 from tank 10 to create a back pressure which trips and terminates dispensing of liquid fuel from the fuel-dispensing nozzle prior to the fuel tank becoming entirely full. However, during normal operation of the vehicle, these valves reopen to allow venting of fuel vapor 15 to vapor-recovery canister 34 during operation. While liquid fuel 16 generally is not supposed to escape past these tank valves and into canister 34, turbulence and high pressure within fuel tank 10 occasionally may cause a small amount of liquid fuel 16 to make its way past these tank valves.

As shown in FIG. 4, in situations where fuel tank 10 is canted toward the first vent valve 30 or forward, vent valve 30 is at least partially and temporarily immersed or submersed in liquid fuel 16, thereby closing float valve assembly 74 within float chamber 44 of vent valve 30, as shown in FIG. 5. At the same time, second vent valve 32 is above the level of liquid fuel 16 in the fuel tank 10 and, therefore, a float valve (not shown) within it will remain open. However, rapid sloshing of liquid fuel 16 within tank 10 may cause liquid fuel 16 to shoot up to second vent valve 32 and escape through it before a float valve within second vent valve 32 has time to close. This results in some liquid fuel 16 traveling from second vent valve 32 through a fuel vapor bridge 26 (as shown in FIG. 4) to inlet nipple 62 of vent valve 30.

Liquid fuel 16, accompanied by fuel vapor 15 or entrained in fuel vapor enters vent valve 30 through inlet nipple 62 must be diverted so that it does not travel across lid chamber 66 and into canister passageway 94. If liquid fuel 16 finds its way into canister passageway 94 of canister nipple 64, it may travel through a fuel vapor conduit 28 to vapor-recovery canister 34 (as shown in FIG. 4), thereby saturating or contaminating vapor-recovery canister 34 making it ineffective. Diversion baffle 70, coupled to and depending away from ceiling 69 of lid chamber 66, creates a barrier to the flow path of second valve passageway 90 which diverts liquid fuel 16 and fuel vapor 15 causing it to substantially change direction. Vapor 15 enters the auxiliary slosh chamber 68, through second valve passageway 90, downward and away from canister passageway 94. In this way, fuel vapor 15 may continue on a path down and around diversion baffle 70 and out through canister passageway 94 as desired (see FIG. 5). However, liquid fuel 16 entering through second valve passageway 90 agglomerates on, and is diverted by, diversion baffle 70 causing liquid fuel 16 collected thereon to travel along or drip down diversion baffle 70, through main chamber 40, and back into fuel tank 10.

As shown in FIG. 6, in another circumstance wherein fuel tank 10 is canted toward second valve 32 or backwards, second vent valve 32 is at least partially and temporarily immersed or submerged in liquid fuel 16 and vent valve 30 remains above the level of liquid fuel 16 within fuel tank 10. In this way, a float valve (not shown) within second vent valve 32 is floated closed, preventing flow of liquid fuel 16 and fuel vapor 15 through it. Vent valve 30 remains open, as shown in FIG. 7, thereby allowing fuel vapor 15 to be vented out of fuel tank 10 and into vapor-recovery canister 34. If liquid fuel 16 sloshes up to vent valve 30, as shown in FIG. 6, float valve 72 within vent valve 30 will preferably quickly float closed to prevent liquid fuel 16 from traveling through vent valve 30, through fuel vapor conduit 28, and to canister 34. However, because float valve 72 may not immediately float closed, some liquid fuel 16 may have an opportunity to pass through venting outlet 48 of vent valve 30.

As shown in FIG. 7, in the present invention, liquid fuel 16 which passes through venting outlet 48 will contact a center portion 55 of protector floor 53 of slosh protector 50 and be redirected back through venting outlet 48 to fuel tank 10. Liquid fuel 16 which is not redirected by slosh protector 50 and which escapes past slosh protector 50 through apertures 54 is intercepted and redirected by top wall 67 and ceiling 69 of auxiliary slosh chamber 68. Primary slosh chamber 42 and auxiliary slosh chamber 68 are formed and sized to create volumes which reduce the velocity of liquid fuel 16 splashing and passing through venting outlet 48. This facilitates agglomeration on, and interception by, slosh protector 50 and top wall 67 and ceiling 69 of auxiliary slosh chamber 68 of liquid fuel 16 which has escaped through venting outlet 48. In this way, primary slosh chamber 42, auxiliary slosh chamber 68, and slosh protector 50 creating a barrier between the two, serve to intercept and redirect liquid fuel 16 which has escaped through venting outlet 48, while at the same time allowing fuel vapor 15 to pass through apertures 54 in protector floor 53 and into canister passageway 94 where it is carried to vapor-recovery canister 34 as desired.

Although the invention has been described in detail with reference to certain preferred embodiments, variations and modifications exist within the scope and spirit of the invention as described and defined in the following claims.

What is claimed is:

1. An apparatus for controlling discharge of fuel vapor from within a vehicle fuel tank, the apparatus comprising
   a valve container adapted to be installed in a fuel tank and formed to include an inlet in communication with the fuel tank, an outlet, and a main chamber defined therebetween,
   a float valve assembly disposed in said main chamber and formed for movement between an open position allowing flow of fuel vapor through the outlet and a closed position preventing flow of at least fuel vapor through the outlet, said float valve assembly controllably providing communication between said inlet and outlet,
   a primary liquid separation chamber in said main chamber defined between said float valve assembly and said outlet,
   an auxiliary liquid separation chamber in said main chamber defined between said primary liquid separation chamber and said outlet,
   said outlet defines a flow path from a second valve to said apparatus and from said apparatus to a vapor control canister, and
   a baffle retained in said container between said primary liquid separation chamber and said auxiliary liquid separation chamber, said baffle includes at least one aperture therein providing communication between said auxiliary liquid separation chamber and said primary liquid separation chamber.

2. The apparatus of claim 1, further comprising a diversion baffle, said diversion baffle extending at least partially across said flow path from said second valve to said canister to divert liquid fuel entrained in said fuel vapor traveling along said flow path, said diversion baffle being oriented to drain into said auxiliary liquid separation chamber.

3. A vent valve for use in a fuel vapor recovery system communicating with a fuel tank, said vent valve comprising a container adapted for installation in said fuel tank having au inlet end communicating with an interior of said tank and a valve lid positioned externally of said tank, said valve lid defining a lid chamber in communication with said tank, said valve lid including an input port and an output port in communication with said lid chamber, a wall disposed in said container defining a main chamber and a float chamber therein, said wall defining at least one vent aperture therethrough, said main chamber positioned between said lid chamber and said float chamber, a float valve operatively disposed in said float chamber of said container for selectively opening and closing said vent aperture responsive to a level of fuel in said tank, a diversion baffle depending from an inside surface of said valve lid and extending in said lid chamber, said diversion baffle being oriented for impeding vapor flow from said input port to said output port and deflecting liquid fuel in said vapor into said main chamber, and a foraminous baffle structure positioned in said main chamber dividing said main chamber into a primary liquid separation chamber between said foraminous baffle structure and said wall and an auxiliary chamber between said foraminous baffle structure and said lid chamber.

4. A vent valve for use in a fuel vapor recovery system communicating with a fuel tank, said vent valve comprising a container defining a main chamber, a valve lid attached to said container and defining a lid chamber communicating with said main chamber, an input port communicating with said lid chamber, an output port communicating with said lid chamber, a wall disposed in said container defining a float chamber spaced from said lid chamber by said main chamber, said wall defining at least one vent aperture therethrough, a float valve operatively disposed in said float chamber for selectively opening and closing said aperture, and a diversion baffle positioned at least partially in said lid chamber, said diversion baffle defining an input chamber, said input chamber communicates with said input port and said lid chamber creating an obstacle to the flow of vapor and fuel from said input port through said lid chamber to said output port for deflecting liquid fuel agglomerating thereon into said container.

5. The apparatus of claim 4, further comprising a foraminous baffle positioned in said main chamber dividing said main chamber into a primary liquid separation chamber between said foraminous baffle and said float valve and an auxiliary liquid separation chamber between said foraminous baffle and said lid chamber.

6. The apparatus of claim 5, further comprising positioning structure for maintaining said baffle in a desired orientation in said main chamber.

7. The apparatus of claim 6, wherein said positioning structure includes at least one ledge against which said baffle is positioned.

8. The apparatus of claim 7, wherein said baffle includes at least one leg to maintain said baffle in a desired orientation between said primary liquid separation chamber and said auxiliary liquid separation chamber.

9. The apparatus of claim 4, wherein said diversion baffle extends a dimension within said lid chamber for producing an obstacle preventing direct flow from the inlet port to the outlet port.

10. The apparatus of claim 4, further comprising an output chamber communicating with said input chamber and said output port, a volume of said input chamber bounded by the extension of said diversion baffle and said lid chamber is less than a volume of said output chamber bounded by the extension of said diversion baffle in said lid chamber.

* * * * *